United States Patent
Huang et al.

(10) Patent No.: US 11,039,336 B2
(45) Date of Patent: Jun. 15, 2021

(54) ADAPTIVE CLOSED LOOP CONGESTION AVOIDANCE AND CONTROL

(71) Applicant: Verizon Patent and Licensing Inc., Arlington, VA (US)

(72) Inventors: Ye Huang, San Ramon, CA (US); Jin Yang, Orinda, CA (US); Sagiv Draznin, Walnut Creek, CA (US); Matthew W. Nelson, Pleasanton, CA (US); Miguel A. Carames, Long Valley, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/553,429

(22) Filed: Aug. 28, 2019

(65) Prior Publication Data
US 2021/0068005 A1 Mar. 4, 2021

(51) Int. Cl.
| | |
|---|---|
| *H04W 28/02* | (2009.01) |
| *H04W 76/11* | (2018.01) |
| *H04W 28/08* | (2009.01) |
| *H04W 8/08* | (2009.01) |
| *H04L 12/801* | (2013.01) |
| *H04W 72/00* | (2009.01) |
| *H04W 64/00* | (2009.01) |

(52) U.S. Cl.
CPC ......... *H04W 28/0289* (2013.01); *H04W 8/08* (2013.01); *H04W 28/0284* (2013.01); *H04W 28/08* (2013.01); *H04W 76/11* (2018.02); *H04L 47/127* (2013.01); *H04W 64/00* (2013.01); *H04W 72/00* (2013.01)

(58) Field of Classification Search
CPC ............. H04W 28/0289; H04W 76/11; H04W 28/0284; H04W 8/08
See application file for complete search history.

(56) References Cited

U.S. PATENT DOCUMENTS

| | | | | |
|---|---|---|---|---|
| 2014/0148122 | A1* | 5/2014 | Meredith | H04W 28/22 455/405 |
| 2017/0195986 | A1* | 7/2017 | Zhang | H04W 4/023 |
| 2018/0005337 | A1* | 1/2018 | Kreiner | H04W 4/02 |
| 2020/0177683 | A1* | 6/2020 | Zhao | H04L 12/1827 |
| 2021/0022034 | A1* | 1/2021 | Zachrison | H04W 28/26 |

* cited by examiner

*Primary Examiner* — Harry H Kim (57) ABSTRACT

A system may receive user device information that includes a location associated with the user device and an identifier of a base station associated with the location and receives load information associated with the base station. The system may determine, based on the user device information and the load information, whether congestion is predicted and perform traffic throttling in response to determining the congestion is predicted. A schedule for adjusting the traffic throttling is determined and the traffic throttling is adjusted based on the schedule.

20 Claims, 6 Drawing Sheets

ADAPTIVE CLOSED LOOP CONGESTION AVOIDANCE AND CONTROL

BACKGROUND INFORMATION

As the number of Internet of Things (IoT) devices increases, a burden is placed on wireless access networks to manage the IoT devices and other user devices associated with the wireless access network. A wireless access network may proactively throttle traffic to avoid congestion and to maximize network resource utilization.

DETAILED DESCRIPTION OF PREFERRED EMBODIMENTS

The following detailed description refers to the accompanying drawings. The same reference numbers in different drawings identify the same or similar elements.

Wireless access networks were traditionally designed to support mobile devices, such as smart phones. However, the increasing number of Internet of Things (IoT) applications have led to a growing number of IoT devices employing machine-to-machine (M2M) communication, such as Machine-Type Communication (MTC). An IoT device may be configured to communicate with other devices without requiring explicit user interaction. IoT devices may have a wide variety of uses, ranging from stationary uses such as utility meters, environmental sensors, parking meters and/or occupancy sensors, security sensors, smart lighting, traffic cameras, advertising displays, point-of-sale terminals, vending machines, remote diagnostics devices, power grid sensors and/or management devices, to mobile and high speed autonomous vehicles and aerial drones.

Uses of IoT devices are envisioned to increase exponentially and may result in a large number of such devices being serviced by a wireless access network. Estimates indicate that the number of IoT devices within a wireless operator's network may increase to hundreds of millions of devices communicating with each other autonomously with little to no human intervention. Thus, a provider of wireless communication services may manage wireless access networks that include a large number of IoT devices.

A wireless network, such as a Fourth Generation (4G) Long Term Evolution (LTE) access network (e.g., an evolved packet core (EPC) network), may use the Evolved Universal Terrestrial Radio Access (E-UTRA) air interface to wirelessly communicate with devices. The bandwidth of an E-UTRA channel in an LTE band may range from about 1.4 to about 20 Megahertz (MHz). In many applications, the data sent or received by IoT devices may be small compared to other types of devices, such as mobile phones used for voice communication or for streaming content. Furthermore, many IoT devices are designed for low power applications and long battery life. Therefore, use of large bandwidth channels that use large amounts of power, such as an LTE channel, for wirelessly communicating with IoT devices may be an inefficient use of radio link resources.

A technology developed for IoT applications that does not require large amounts of data and that is based on a Low Power Wide Area Network (LPWAN) design is LTE Category M1 (CAT-M1). CAT-M1 channels, also sometimes referred to as enhanced MTC (eMTC) channels, use a total bandwidth of about 1.4 MHz and have a very low power requirement compared to an LTE channel. Another technology developed for IoT applications that does not require large amounts of data or power, is the Narrow Band (NB) IoT (NB-IoT) technology. NB-IoT is an LPWAN technology that uses 200 Kilohertz (KHz) channels, with their own guard bands, for sending small amounts of data. The use of NB-IoT channels may result in better signal penetration in hard to reach areas, such as areas likely to be occupied by IoT devices (e.g., a utility meter installed in a location that shadows or fades wireless signals). Furthermore, the use of NB-IoT channels may result in lower energy consumption and/or cheaper component cost.

A high density of IoT devices, including CAT-M1 and NB-IoT devices using Radio Resource Control (RRC) signaling, operating simultaneously in a cell may cause congestion in the cell. The congestion may affect consumer traffic as well as disrupt IoT device operations. The disruptions may cause customer dissatisfaction as well as potentially interfere with mission critical IoT device applications. Some congestion control schemes are passive and reactive and may only throttle traffic after congestion already occurs. In addition, current systems to throttle network traffic may be located remotely from the network. Other congestion control schemes may compound the congestion and provide a poor customer experience.

Implementations described herein relate to a closed loop adaptive congestion avoidance system. In an embodiment, devices connected to a network may be monitored to determine the types of devices and the cells where the devices are located. In addition, load levels per cell and load limits per cell may be monitored. Based on a predicted congestion and a predicted congestion duration in a cell, traffic may be throttled to ensure the cell does not become congested.

In one implementation, a predicted congestion level associated with the cell may be determined. If the predicted congestion level is at a warning level, a request may be sent to application servers providing content to users in the congested cell to throttle traffic destined to the congested cell. If the predicted congestion level is at a critical level, a message may be sent to user devices in the congested cell to control traffic originating from the user devices. In addition, user plane traffic destined for the congested cell may be blocked. In another implementation, a back-off schedule may be determined based on the predicted congestion duration. In this implementation, congestion control may be adjusted based on the predicted congestion duration to minimize unnecessary throttling in the network.

Figure 1:
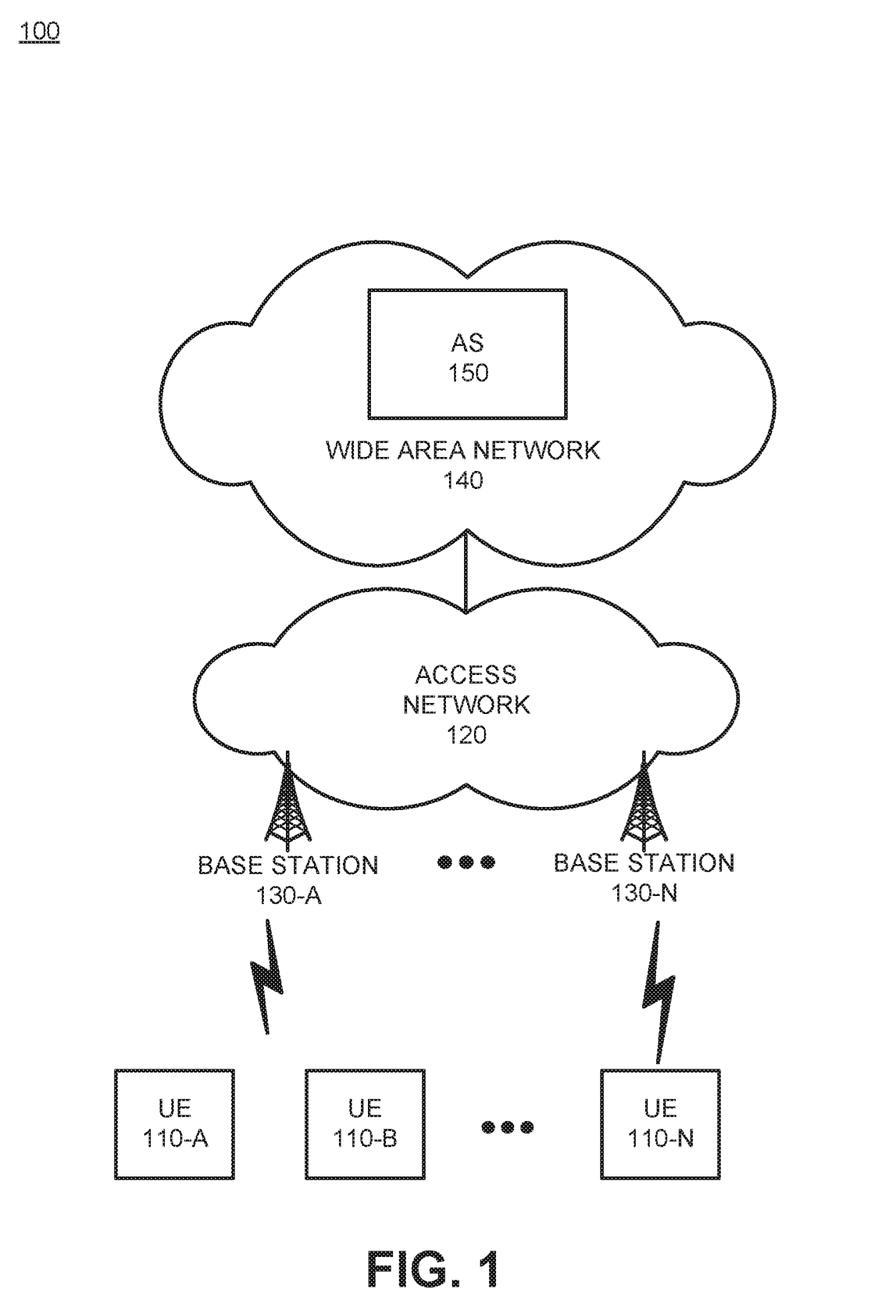
FIG. 1 is a diagram illustrating an exemplary network environment consistent with an embodiment.

FIG. 1 is a diagram illustrating an exemplary network environment 100 consistent with an embodiment. As shown in FIG. 1, environment 100 may include endpoint user equipment devices (UEs) 110-A to 110-N (referred to herein collectively as "UEs 110" and individually as "UE 110"), an access network 120, a wide area network (WAN) 140, and an application server (AS) 150.

UEs 110 may include any device with (e.g., cellular or mobile wireless network) wireless communication functionality. For example, UEs 110 may communicate using M2M communication, such as MTC. For example, UE 110 may include a utility meter (e.g., electricity meter, water meter, gas meter, etc.), an asset tracking device (e.g., a system monitoring the geographic location of a fleet of vehicles, etc.), a personal tracking device (e.g., a system monitoring the geographic location of people, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), health monitoring device (e.g., a blood pressure monitoring device, a blood glucose monitoring device, etc.), and/or another type of electronic device with communication capabilities.

In other implementations, UE 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and/or a user interface.

Access network 120 may provide access to WAN 140 for UEs 110. Access network 120 may enable UEs 110 to connect to WAN 140 for Internet Protocol (IP) services and/or non-IP data delivery (NIDD) services, mobile telephone service, Short Message Service (SMS), Multimedia Message Service (MMS), multimedia broadcast multicast service (MBMS), Internet access, cloud computing, and/or other types of data services.

Access network 120 may establish or may be incorporated into a packet data network connection between UE 110 and WAN 140 via one or more Access Point Names (APNs). For example, access network 120 may establish a non-IP connection between UE 110 and WAN 140. Furthermore, through an APN, access network 120 may enable UE 110 to communicate with AS 150 via WAN 140.

In some implementations, access network 120 may include a Long Term Evolution (LTE) access network (e.g., an evolved packet core (EPC) network). In other implementations, access network 120 may include a Code Division Multiple Access (CDMA) access network. For example, the CDMA access network may include a CDMA enhanced High Rate Packet Data (eHRPD) network (which may provide access to an LTE access network).

Furthermore, access network 120 may include an LTE Advanced (LTE-A) access network and/or a Fifth Generation (5G) access network or other advanced network that includes functionality such as 5G new radio (NR) base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (Het-Nets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

As described herein, access network 120 may include base stations 130-A to 130-N (referred to herein collectively as "base stations 130" and individually as "base station 130"). Each base station 130 may service a set of UEs 110. For example, base station 130-A may service UEs 110-A and 110-B, and base station 130-N may service UE 110-N. Base station 130 may include a 5G base station (e.g., a next generation node B (gNodeB)) that includes one or more radio frequency (RF) transceivers (also referred to as "cells" and/or "base station sectors") facing particular directions. For example, base station 130 may include three RF transceivers and each RF transceiver may service a 120° sector of a 360° field of view. Each RF transceiver may include an antenna array. The antenna array may include an array of controllable antenna elements configured to send and receive 5G NR wireless signals via one or more antenna beams. The antenna elements may be digitally controllable to electronically tilt, or adjust the orientation of, an antenna beam in a vertical direction and/or horizontal direction. In some implementations, the antenna elements may additionally be controllable via mechanical steering using one or more motors associated with each antenna element. The antenna array may serve k UEs 110 and may simultaneously generate up to k antenna beams. A particular antenna beam may service multiple UEs 110. In some implementations, base station 130 may also include a 4G base station (e.g., an evolved NodeB (eNodeB)).

WAN 140 may include any type of wide area network, a metropolitan area network (MAN), an optical network, a video network, a satellite network, a wireless network (e.g., a CDMA network, a general packet radio service (GPRS) network, an LTE network, and/or a 5G network), an ad hoc network, a telephone network (e.g., the Public Switched Telephone Network (PSTN) or a cellular network), an intranet, or a combination of networks. Some or all of WAN 140 may be managed by a provider of communication services that also manages access network 120 and/or UEs 110. WAN 140 may allow the delivery of IP and/or non-IP services to/from UE 110, and may interface with other external networks. WAN 140 may include one or more server devices and/or network devices, or other types of computation or communication devices. In some implementations, WAN 140 may include an IP Multimedia Subsystem (IMS) network (not shown in FIG. 1). An IMS network may include a network for delivering IP multimedia services and may provide media flows between UE 110 and external IP networks or external circuit-switched networks (not shown in FIG. 1).

AS 150 may include one or more devices, such as computer devices, databases, and/or server devices, that facilitate non-IP data delivery services. Such services may include supporting IoT applications such as alarms, sensors, medical devices, metering devices, smart home devices, wearable devices, retail devices, etc. Other services may be also be supported by AS 150, such as communications applications (e.g., short message service (SMS), etc.), automotive applications, aviation applications, etc. AS 150 may communicate with UEs 110 over access network 120 using IP and/or non-IP bearer channels. While only one AS 150 is shown in FIG. 1, in various embodiments, multiple application servers may be associated with different entities and used within environment 100. Application servers 150 may be supported by service providers associated with various organizations (e.g., companies, non-profits, collaborative enterprises, etc.).

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
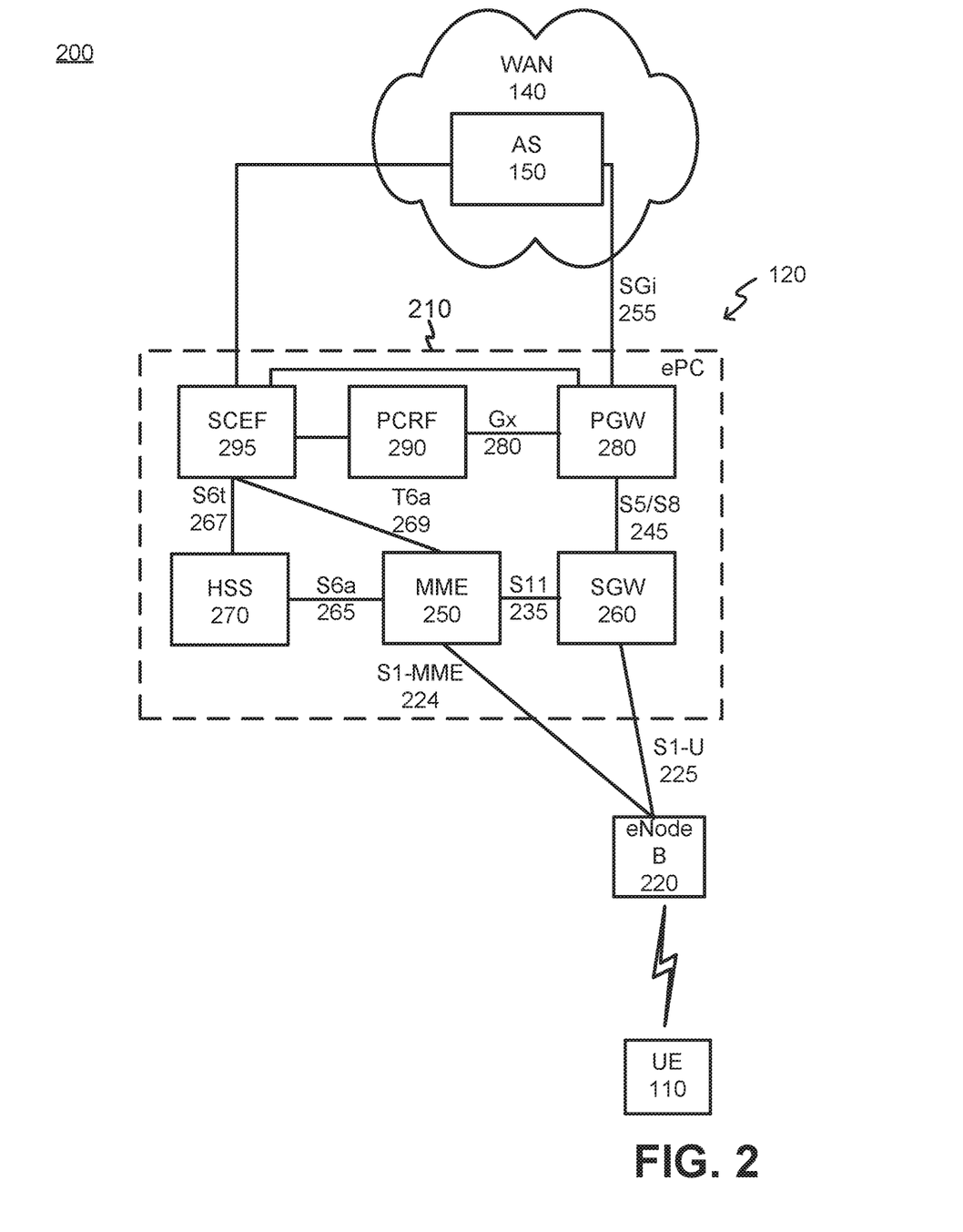
FIG. 2 is a block diagram of an exemplary system having an access network based on an LTE standard.

FIG. 2 is a block diagram of an exemplary networking system 200 including access network 120 based on the LTE standard. Access network 120 may include an LTE network with an evolved Packet Core (ePC) 210 and eNodeB 220 (corresponding, for example, to base station 130). UE 110 and eNodeB 220 may exchange data over a radio access technology (RAT) based on LTE air channel interface protocols. In the embodiment shown in FIG. 2, ePC 210 may operate in conjunction with an evolved Universal Mobile Telecommunications System (UMTS) Terrestrial Network (eUTRAN) that includes at least one eNodeB 220. Networking system 200 may further include an Internet Protocol (IP) network and/or a non-IP network, which may be embodied separately or included in a backhaul network (not shown) and/or in WAN 140. As shown in FIG. 2, AS 150 may be connected to WAN 140 over a wired or wireless connection, using, for example, transmission control protocol/internet protocol (TCP/IP) and/or using a non-IP based protocol.

EPC 210 may include one or more devices that are physical and/or logical entities interconnected via standardized interfaces. EPC 210 may provide wireless packet-switched services and wireless packet connectivity to user devices to provide, for example, data, voice, and/or multimedia services. EPC 210 may further include a MME 250, a serving gateway (SGW) 260, a home subscriber server (HSS) 270, a packet data network gateway (PGW) 280, a Policy and Charging Rules Function (PCRF) 290, and a Service Capability Exposure Function (SCEF) 295. It is noted that FIG. 2 depicts a representative networking system 200 with exemplary components and configuration shown for purposes of explanation. Other embodiments may include additional or different network entities in alternative configurations than which are exemplified in FIG. 2.

Further referring to FIG. 2, eNodeB 220 may include one or more devices and other components having functionality that allows UE 110 to wirelessly connect via the RAT of eNodeB 220. eNodeB 220 may interface with ePC 210 via a S1 interface, which may be split into a control plane S1-MME interface 224 and a data plane S1-U interface 225. eNodeB 220 may interface with MME 250 via S1-MME interface 224, and interface with SGW 260 via S1-U interface 225. S1-U interface 225 may be implemented, for example, using general packet radio service (GPRS) Tunnelling Protocol (GTP). S1-MME interface 224 may be implemented, for example, with a protocol stack that includes a Non-Access Stratum (NAS) protocol and/or Stream Control Transmission Protocol (SCTP).

MME 250 may implement control plane processing for both the primary access network and the secondary access network. For example, through eNodeB 220, MME 250 may activate and deactivate bearers for UE 110. MME 250 may also select a particular SGW 260 for a particular UE 110. MME 250 may interface with other MMEs (not shown) in ePC 210 and may send and receive information associated with UEs 110, which may allow one MME 250 to take over control plane processing of UEs serviced by another MME 250, if the other MME becomes unavailable.

SGW 260 may provide an access point to and from UE 110, may handle forwarding of data packets for UE 110, and may act as a local anchor point during handover procedures between eNodeBs 220. SGW 260 may interface with PGW 280 through an S5/S8 interface 245. S5/S8 interface 245 may be implemented, for example, using GTP.

PGW 280 may function as a gateway to WAN 140 through a SGi interface 255. WAN 140 may provide various services (e.g., firmware updates, over the top voice services, etc.) to UE 110. A particular UE 110, while connected to a single SGW 260, may be connected to multiple PGWs 280, one for each packet network with which UE 110 communicates.

Alternatively, UE 110 may exchange data with WAN 140 though a WiFi wireless access point (WAP) (not shown). The WiFi WAP may be part of a local area network, and access WAN 140 through a wired connection via a router. Alternatively, the WiFi WAP may be part of a mesh network (e.g., IEEE 802.11s). The WiFi WAP may operate in accordance with any type of WiFi standard (e.g., any IEEE 802.11x network, where x=a, b, c, g, and/or n), and/or include any other type of wireless network technology for covering larger areas, and may include a mesh network (e.g., IEEE 802.11s) and/or a WiMAX IEEE 802.16. The WiFi WAP may also be part of a wide area network (WiMAX) or a mesh network (802.11s).

MME 250 may communicate with SGW 260 through an S11 interface 235. S11 interface 235 may be implemented, for example, using GTPv2. S11 interface 235 may be used to create and manage a new session for a particular UE 110. S11 interface 235 may be activated when MME 250 needs to communicate with SGW 260, such as when the particular UE 110 attaches to ePC 210, when bearers need to be added or modified for an existing session for the particular UE 110, when a connection to a new PGW 280 needs to be created, or during a handover procedure (e.g., when the particular UE 110 needs to switch to a different SGW 260).

HSS 270 may store information associated with UE 110 and/or information associated with users of UE 110. For example, HSS 270 may store user profiles that include registration, authentication, and access authorization information. HSS 270 may additionally store information about UE 110, such as whether UE 110 is capable of switching from NB-IoT mode to CAT-M1 mode. MME 250 may communicate with HSS 270 through an S6a interface 265. S6a interface 265 may be implemented, for example, using a Diameter protocol.

PCRF 290 may provide policy control decision and flow based charging control functionalities. PCRF 290 may provide network control regarding service data flow detection, gating, quality of service (QoS) and flow based charging, etc. PCRF 290 may determine how a certain service data flow shall be treated, and may ensure that user plane traffic mapping and treatment is in accordance with a user's subscription profile based, for example, on a specified QoS class identifier (QCI). PCRF 290 may communicate with PGW 280 using a Gx interface 280. Gx interface 280 may be implemented, for example, using a Diameter protocol.

SCEF 295 may include a network or computational device that provides exposure of 3GPP network service capabilities to third party applications. Specifically, SCEF 295 may provide network events through application programming interfaces (APIs) to external applications which may reside on AS 150 and/or UEs 110. Exposure of the various events may include, for example: UE 110 reachability; UE 110 loss of connectivity; UE 110 location reporting; UE 110 roaming status; communication failure; and change of international mobile equipment identifier—international mobile subscriber identifier (IMEI-IMSI) association. SCEF 295 may facilitate NIDD services through a non-IP packet data network (PDN) established through SCEF 295. In one implementation, SCEF 295 may exchange control plane signaling with MME 250 (via a T6a interface 269 using Diameter protocol) and/or HSS 270 (via an Sh or S6t interface 267). In one implementation, SCEF 295 may be included as part of a control plane bearer path between UE device 110 and AS 150. According to an implementation described herein, SCEF 295 may act as a gateway for connecting UE 110 to AS 150. Generally, SCEF 295 may expose APIs for multiple application servers (such as AS 150) to access network services to communicate with UEs 110. SCEF 295 may communicate with MME 250 via a modified T6a interface relative to a standardized T6a interface.

While FIG. 2 shows exemplary components of networking system 200, in other implementations, networking system 200 may include fewer components, different components, differently arranged components, or additional components than depicted in FIG. 2. Additionally or alternatively, one or more components of networking system 200 may perform functions described as being performed by one or more other components of networking system 200.

Figure 3:
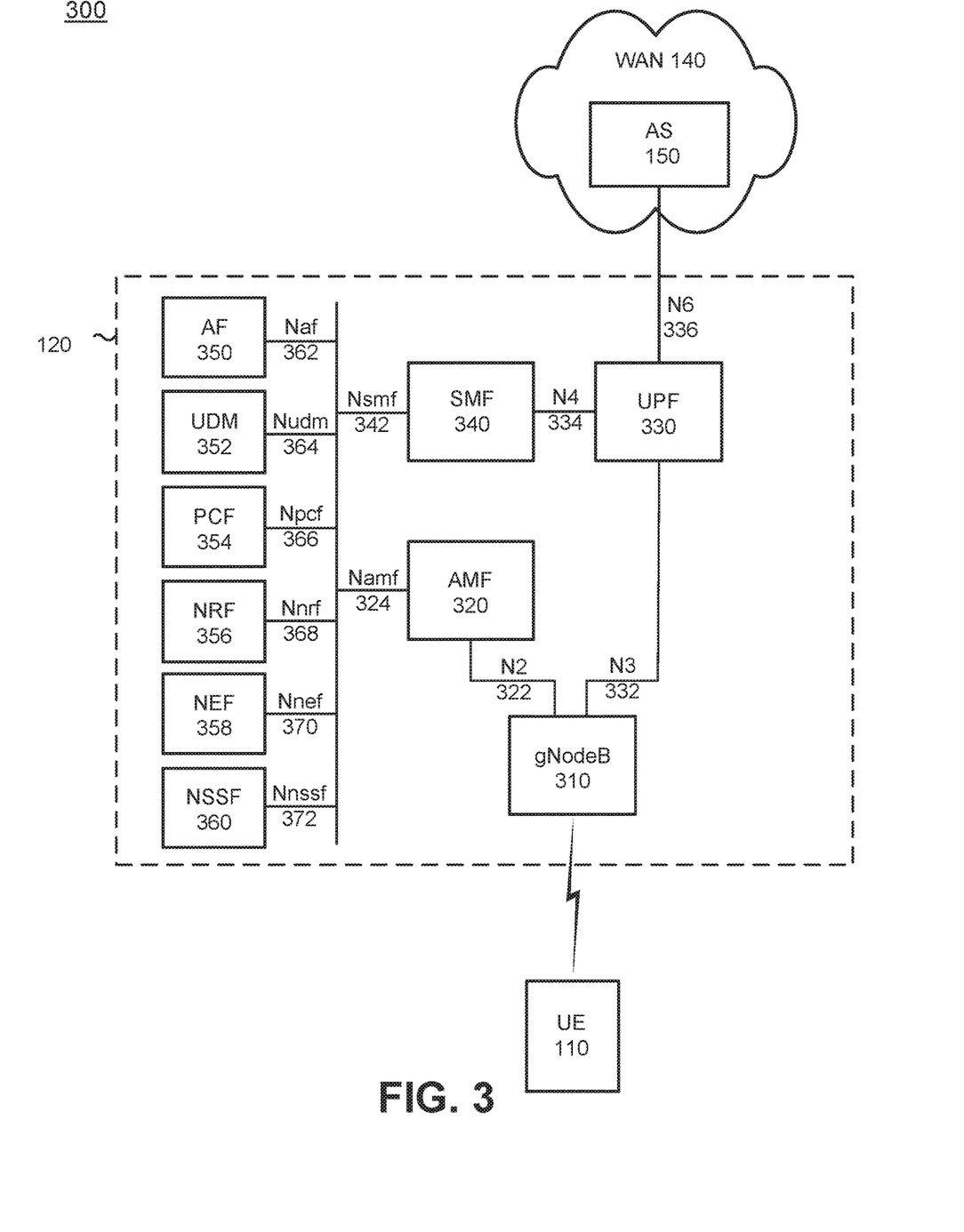
FIG. 3 is a block diagram of an exemplary system having an access network based on a 5G standard.

FIG. 3 is a block diagram of an exemplary system 300 having an access network 120 based on a 5G standard. As shown in FIG. 3, system 300 may include UE 110, access network 120, WAN 140, and AS 150.

Access network 120 may include a gNodeB 310 (corresponding to base station 130), an Access and Mobility Management Function (AMF) 320, a User Plane Function (UPF) 330, a Session Management Function (SMF) 340, an Application Function (AF) 350, a Unified Data Management (UDM) 352, a Policy Control Function (PCF) 354, a Network Repository Function (NRF) 356, a Network Exposure Function (NEF) 358, and a Network Slice Selection Function (NSSF) 360. While FIG. 3 depicts a single gNodeB 310, AMF 320, UPF 330, SMF 340, AF 350, UDM 352, PCF 354, NRF 356, NEF 358, and/or NSSF 360 for exemplary illustration purposes, in practice, FIG. 3 may include multiple gNodeBs 310, AMFs 320, UPFs 330, SMFs 340, AFs 350, UDMs 352, PCFs 354, NRFs 356, NEFs 358, and NSSFs 360.

gNodeB 310 may include one or more devices (e.g., base stations) and other components and functionality that enable UE 110 to wirelessly connect to access network 120 using 5G NR Radio Access Technology (RAT). For example, gNodeB 310 may include one or more cells, with each cell including a wireless transceiver with an antenna array configured for millimeter-wave wireless communication. gNodeB 310 may implement one or more RAN slices to partition access network 120. gNodeB 310 may communicate with AMF 320 using an N2 interface 322 and communicate with UPF 330 using an N3 interface 332.

AMF 320 may perform registration management, connection management, reachability management, mobility management, lawful intercepts, Short Message Service (SMS) transport between UE 110 and an SMS function (not shown in FIG. 3), session management messages transport between UE 110 and SMF 340, access authentication and authorization, location services management, functionality to support non-3GPP access networks, and/or other types of management processes. In some implementations, AMF 320 may implement some or all of the functionality of managing RAN slices in gNodeB 310. AMF 320 may be accessible by other function nodes via a Namf interface 324.

UPF 330 may maintain an anchor point for intra/inter-RAT mobility, maintain an external Packet Data Unit (PDU) point of interconnect to a data network (e.g., WAN 140), perform packet routing and forwarding, perform the user plane part of policy rule enforcement, perform packet inspection, perform lawful intercept, perform traffic usage reporting, enforce QoS policies in the user plane, perform uplink traffic verification, perform transport level packet marking, perform downlink packet buffering, send and forward an "end marker" to a Radio Access Network (RAN) node (e.g., gNodeB 310), and/or perform other types of user plane processes. UPF 330 may communicate with SMF 340 using an N4 interface 334 and connect to WAN 140 using an N6 interface 336.

SMF 340 may perform session establishment, modification, and/or release, perform IP address allocation and management, perform Dynamic Host Configuration Protocol (DHCP) functions, perform selection and control of UPF 330, configure traffic steering at UPF 330 to guide traffic to the correct destination, terminate interfaces toward PCF 354, perform lawful intercepts, charge data collection, support charging interfaces, control and coordinate of charging data collection, termination of session management parts of network access stratum (NAS) messages, perform downlink data notification, manage roaming functionality, and/or perform other types of control plane processes for managing user plane data. SMF 340 may be accessible via an Nsmf interface 342.

AF 350 may provide services associated with a particular application, such as, for example, application influence on traffic routing, accessing NEF 358, interacting with a policy framework for policy control, and/or other types of applications. AF 350 may be accessible via a Naf interface 362.

UDM 352 may maintain subscription information for UE 110, manage subscriptions, generate authentication credentials, handle user identification, perform access authorization based on subscription data, perform network function registration management, maintain service and/or session continuity by maintaining assignment of SMF 340 for ongoing sessions, support SMS delivery, support lawful intercept functionality, and/or perform other processes associated with managing user data.

PCF 354 may support policies to control network behavior, provide policy rules to control plane functions (e.g., to SMF 340), access subscription information relevant to policy decisions, execute policy decisions, and/or perform other types of processes associated with policy enforcement. PCF 354 may be accessible via Npcf interface 366. PCF 354 may specify QoS policies based on QoS flow identity (QFI) consistent with 5G network standards.

NRF 356 may support a service discovery function and maintain a profile of available network function (NF) instances and their supported services. An NF profile may include an NF instance identifier (ID), an NF type, a Public Land Mobile Network (PLMN) ID associated with the NF, a network slice ID associated with the NF, capacity information for the NF, service authorization information for the NF, supported services associated with the NF, endpoint information for each supported service associated with the NF, and/or other types of NF information. NRF 356 may be accessible via an Nnrf interface 368.

NEF 358 may expose capabilities, events, and/or status to other NFs, including third party NFs, AFs, edge computing NFs, and/or other types of NFs. For example, NEF 358 may provide capabilities and events/status of UE 110 to AS 150. Furthermore, NEF 358 may secure provisioning of information from external applications to access network 120, translate information between access network 120 and devices/networks external to access network 120, support a Packet Flow Description (PFD) function, and/or perform other types of network exposure functions. NEF 358 may be accessible via Nnef interface 370.

NSSF 360 may select a set of network slice instances to serve a particular UE 110, determine network slice selection assistance information (NSSAI), determine a particular AMF 320 to serve a particular UE 110, and/or perform other types of processes associated with network slice selection or management. In some implementations, NSSF 360 may implement some or all of the functionality of managing RAN slices in gNodeB 310. NSSF 360 may be accessible via Nnssf interface 372.

Although FIG. 3 shows exemplary components of access network 120, in other implementations, access network 120 may include fewer components, different components, differently arranged components, or additional components than depicted in FIG. 3. Additionally or alternatively, one or more components of access network 120 may perform functions described as being performed by one or more other components of access network 120. For example, access network 120 may include additional function nodes not shown in FIG. 3, such as an Authentication Server Function (AUSF), a Non-3GPP Interworking Function (N3IWF), a Unified Data Repository (UDR), an Unstructured Data Storage Network Function (UDSF), an SMS function (SMSF), a 5G Equipment Identity Register (5G-EIR) function, a Location Management Function (LMF), a Security Edge Protection Proxy (SEPP) function, and/or other types of functions. Furthermore, while particular interfaces have been described with respect to particular function nodes in FIG. 3, additionally or alternatively, access network 120 may include a reference point architecture that includes point-to-point interfaces between particular function nodes.

Figure 4:
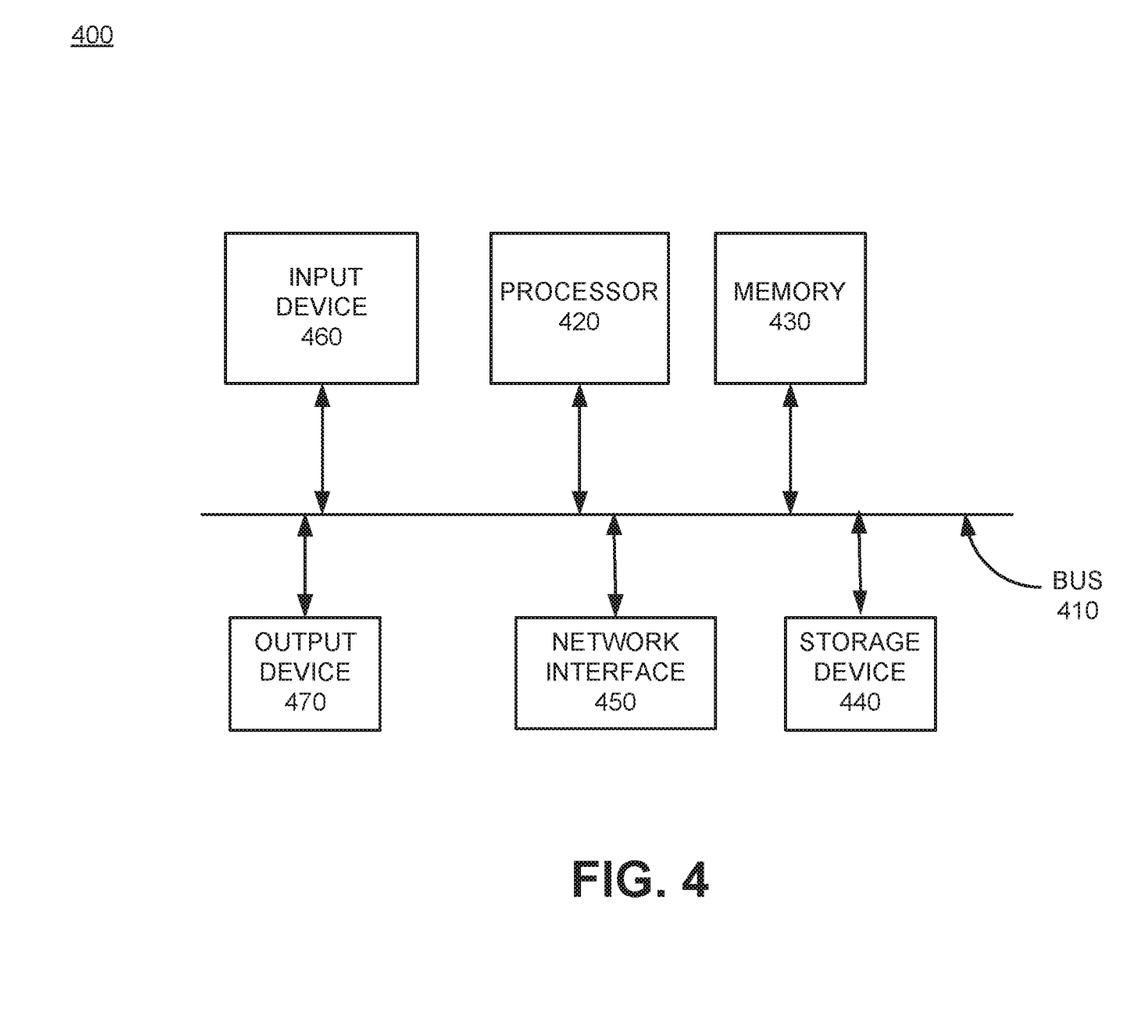
FIG. 4 is a block diagram showing exemplary components of a network device according to an embodiment.

FIG. 4 is a block diagram showing exemplary components of a network device 400 according to an embodiment. Network device 400 may include one or more network elements illustrated in FIG. 2 and/or FIG. 3, such as, for example, UE 110, AS 150, MME 250, AMF 320, HSS 270, UDM 352, SCEF 295, and/or NEF 358, etc. In some embodiments, there may be a plurality of network devices 400 providing functionality of one or more network elements. Alternatively, once network device 400 may perform the functionality of any plurality of network elements. Network device 400 may include a bus 410, a processor 420, a memory 430, storage device 440, a network interface 450, input device 460, and an output device 470.

Bus 410 provides a path that permits communication among the components of network device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may use any operating system, which may include varieties of the Windows, UNIX, and/or Linux operating systems. Processor 420 may also use high-level analysis software packages and/or custom software written in any programming and/or scripting languages for interacting with other network entities are communicatively coupled to WAN 140.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read only memory (ROM) device or another type of static storage device, and/or a removable form of memory, such as a flash memory. Storage device 440 may include any type of on-board device suitable for storing large amounts of data, and may include one or more hard drives, solid state drives, and/or various types of redundant array of independent disks (RAID) arrays. In an embodiment, storage device 440 may store profile data associated with UEs 110.

Network interface 450 may include a transceiver that enables network device 400 to communicate with other devices and/or systems in network environment 100. Network interface 450 may be configured to exchange data with WAN 140 over wired communications (e.g., conductive wire, twisted pair cable, coaxial cable, transmission line, fiber optic cable, and/or waveguide, etc.), or a combination of wireless. In other embodiments, network interface 450 may interface with wide area network 140 using a wireless communications channel, such as, for example, radio frequency (RF), infrared, and/or visual optics, etc. Network interface 450 may include a transmitter that converts baseband signals to RF signals and/or a receiver that converts RF signals to baseband signals. Network interface 450 may be coupled to one or more antennas for transmitting and receiving RF signals. Network interface 450 may include a logical component that includes input and/or output ports, input and/or output systems, and/or other input and output components that facilitate the transmission/reception of data to/from other devices. For example, network interface 450 may include a network interface card (e.g., Ethernet card) for wired communications and/or a wireless network interface (e.g., a WiFi) card for wireless communications. Network interface 450 may also include a universal serial bus (USB) port for communications over a cable, a Bluetooth® wireless interface, an radio frequency identification device (RFID) interface, a near field communications (NFC) wireless interface, and/or any other type of interface that converts data from one form to another form.

As described below, network device 400 may perform certain operations relating to communicating from AS 150 to UEs 110. Network device 400 may perform these operations in response to processor 420 executing software instructions contained in a computer-readable medium, such as memory 430 and/or storage device 440. The software instructions may be read into memory 430 from another computer-readable medium or from another device. The software instructions contained in memory 430 may cause processor 420 to perform processes described herein. Alternatively, hardwired circuitry may be used in place of, or in combination with, software instructions to implement processes described herein. Thus, implementations described herein are not limited to any specific combination of hardware circuitry and software. In an embodiment, the software instructions and/or hardware circuitry may perform the process exemplified by the signal flows in FIGS. 5 and 6 and the flow chart shown in FIG. 7.

Although FIG. 4 shows exemplary components of network device 400, in other implementations, network device 400 may include fewer components, different components, additional components, or differently arranged components than depicted in FIG. 4.

Figure 5:
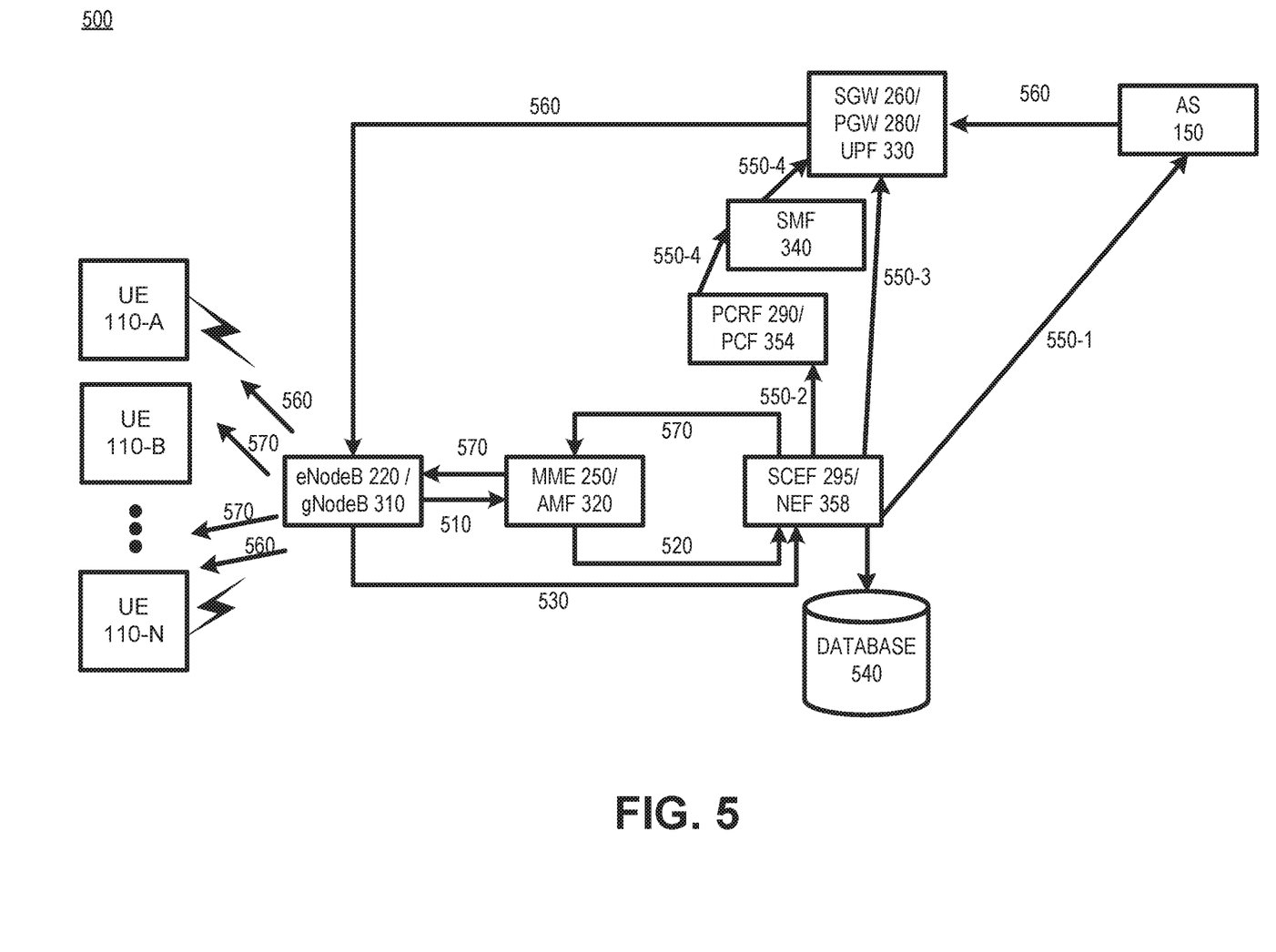
FIG. 5 is a block diagram showing exemplary message flows within a networking system for performing adaptive congestion control.

FIG. 5 is a diagram illustrating exemplary communications between devices in network environment 100. Communications in FIG. 5 represent communications for performing dynamic throttling based on cell load and shows network components which may correspond to both LTE and 5G network standards. The LTE components are shown with the label "2XX" and the 5G components are shown with the label "3XX." For example, as shown in FIG. 5, the base station elements are shown as "eNodeB 220/gNodeB 310," the mobility managers are shown as "MME 250/AMF 320," etc.

Referring to FIG. 5, UE 110 may attach to eNodeB 220/gNodeB 310 and may register with MME 220/AMF 320 (510). For example, UE 110 may power up from an idle state or may change locations and attach to eNodeB 220/gNodeB 310. Based on UE 110 registering, MME 250/AMF 320 may determine features associated with UE 110. For example, MME 250/AMF 320 may determine a device type for UE 110, RAT type associated with UE 110, a cell identifier (ID) associated with UE 110, an APN associated with UE 110, an AS 150 associated with UE 110, and additional features. MME 220/AMF 320 may transmit a signal 520 including information associated with UE 110 to SCEF 295/NEF 358. For example, MME 250/AMF 320 may send information identifying UE 110 as well as a cell ID, a RAT type, an APN associated with UE 110, an AS 150 associated with UE 110, and additional information to SCEF 295/NEF 358.

Continuing with FIG. 5, eNodeB 220/gNodeB 310 may transmit a signal 530 associated with eNodeB 220/gNodeB 310 to SCEF 295/NEF 320. For example, eNodeB 220/gNodeB 310 may transmit a cell identifier associated with eNodeB 220/gNodeB 310, a current overall load level, a current load level per RAT type, and a predicted duration of congestion if eNodeB 220/gNodeB 310 is congested or will likely be congested. The predicted duration of congestion may be based on historic and heuristic network traffic and congestion data. Since UEs 110 may change locations and connect to different eNodeBs 220/gNodeBs 310, eNodeB 220/gNodeB 310 may transmit an updated signal 530 periodically. For example, the current overall load level and the current load level per RAT type may change when UEs 110 change locations. Therefore, eNodeB 220/gNodeB 310 may periodically transmit updated signal 530 to SCEF 295/NEF 358 with updated information. In order to avoid oscillation or changes associated with throttling traffic, signal 530 may not be provided in real time. In addition, because signal 530 may include a predicted duration of congestion, signal 530 may be provided to SCEF 295/NEF 358 at periodic intervals, such as every five minutes, 30 minutes, etc. Therefore, SCEF 295/NEF 358 may be able to perform congestion control based on the predicted period of congestion without receiving an updated signal 530. In this way, unnecessary throttling of traffic may be avoided. Since updated signal 530 may be provided periodically, then alarm signals may also be configurable in duration. For example, a length of an alarm signal may be based on a length of time between updated signals 530.

SCEF 295/NEF 358 may receive signal 520 from MME 250/AMF 320 and signal 530 from eNodeB 220/gNodeB 310 and may store the information in the signals in a table in database 540. Based on the received information and a cell ID associated with eNodeB 220/gNodeB 310, SCEF 295/NEF 358 may determine whether a congestion condition is likely to occur with respect to eNodeB 220/gNodeB 310. For example, SCEF 295/NEF 358 may store a congestion threshold associated with eNodeB 220/gNodeB 310. Based on receiving the current information associated with eNodeB 220/gNodeB 310 and the congestion threshold associated with eNodeB 220/gNodeB 310, SCEF 295/NEF 358 may determine whether eNodeB 220/gNodeB 310 is likely to become congested. The threshold may be based on an overall load that eNodeB 220/gNodeB 310 can handle in typical conditions or based on an overall load that eNodeB 220/gNodeB 310 historically can handle without becoming overburdened.

In addition, SCEF 295/NEF 358 may further determine a congestion level associated with a current load of eNodeB 220/gNodeB 310. In one implementation, three levels may be associated with the current load of eNodeB 220/gNodeB 310, with level 1 being associated with no congestion, level 2 being associated with a warning level, and level 3 being associated with a critical level. In other implementation, fewer or additional levels may be associated with the congestion of eNodeB 220/gNode B 310.

SCEF 295/NEF 358 may further store the information associated with UEs 110 in the table in database 540 and associate the information with the cell identifier associated with eNodeB 220/gNodeB 310. For example, SCEF 295/NEF 358 may store RAT types associated with UEs 110, ASs 150 serving UEs 110, and additional information. Since UEs 110 may change locations, the information stored in the table in database 540 may change based on the UEs attached to eNodeB 220/gNodeB 310.

Continuing with FIG. 5, SCEF 295/NEF 358 may take actions based on the calculated congestion level associated with eNodeB 220/gNodeB 310. For example, if no congestion is detected or predicted, SCEF 295/NEF 358 may take no action. If a warning level is predicted, SCEF 295/NEF 358 may transmit signals 550-1 through 550-4 instructing AS 150 and other elements to exercise throttling. Because user plane traffic may constitute the majority of traffic in a network, performing throttling and congestion control close to the traffic source may be effective to reduce downstream network element and cell site congestion.

As shown in FIG. 5, SCEF 295/NEF 358 may transmit signal 550-1 to AS 150 serving UEs 110 notifying AS 150 to throttle traffic destined for UEs 110. Although only one AS 150 is shown in FIG. 5 for simplicity, SCEF 295/NEF 358 may transmit additional signals 550-1 to additional application servers 150 associated with UEs 110. In addition, SCEF 295/NEF 358 may transmit signals 550-2 and 550-3 to PCRF 290/PCF 354 and SGW 260/PGW 280/UPF 330, respectively, instructing PCRF 290/PCF 354 and SGW 260/PGW 280/UPF 330 to throttle mobile originated (MO) and mobile terminated (MT) traffic associated with UEs 110 in order to reduce or avoid user plane congestion. PCRF 290/PCF 354 may, in turn, transmit signal 550-4 to SMF 340 and SMF 340 may transmit signal 550-4 to SGW 260/PGW 280/UPF 330 indicating a throttle policy.

Once AS 150 has received signals 550-1 to throttle traffic, AS 150 may transmit throttled traffic 560 to UEs 110. As shown in FIG. 5, AS 150 may transmit throttled traffic 560 to UEs 110 via SGW 260/PGW 280/UPF 330 and eNodeB 220/gNodeB 310. In this way, AS 150 and SCEF 295/NEF 358 may throttle traffic destined for UEs 110 in a congested cell to avoid further congestion in the cell. In another implementation, SCEF 295/NEF 358 may buffer traffic destined for UEs 110 and transmit the traffic to UEs 110 when the congestion has been eased.

If the calculated congestion level reaches a critical level, SCEF 295/NEF 358 may take measures to control mobile originated (MO) traffic and block mobile terminated (MT) user plane traffic to UEs 110 in the congested cell. As shown in FIG. 5, SCEF 295/NEF 358 may transmit command 570 to MME 250/AMF 320 and MME 250/AMF 320 may forward command 570 to eNodeB 220/gNodeB 310 instructing eNodeB 220/gNodeB 310 to throttle traffic originating from UEs 110 and block traffic destined for the congested cell. As further shown in FIG. 5, eNodeB 220/gNodeB 310 may broadcast command 570 to UEs 110 indicating that congestion control of MO traffic is in effect so that UEs 110 may control the MO traffic in the congested cell.

Signal 570 may further indicate a type of traffic to throttle. For example, signal 570 may indicate that throttling should be performed using an application specific congestion control for data communication (ACDC) in which access attempts from particular applications in UEs 110 in an idle mode may be prevented. Additionally, signal 570 may indicate that UEs 110 that are configured for Extended Access Barring (EAB) should be restricted from accessing the network. As another example, signal 570 may indicate that traffic originating from CAT-M1 IoT or NB-IoT devices should be throttled. Alternatively, indicate 570 may indicate that consumer traffic or certain types of consumer traffic should be throttled.

In addition, signal 570 may include a backoff timer. When eNodeB 220/gNodeB 310 is experiencing congestion, if UE 110 attempts to access the network, eNodeB 220/gNodeB 310 may instruct UE 110 to wait a period of time based on the backoff timer before attempting to connect. In one implementation, the backoff timer may be randomized. In another implementation, the backoff timer may be set based on the congestion level.

SCEF 295/NEF 358 may further formulate a throttle back-off schedule for MT user plane traffic based on a predicted duration of congestion. The predicted duration of congestion may be based on information provided in signal 530. The prediction may be based on an upward trending algorithm including heuristic and historic traffic and congestion data. Because signal 530 may be received periodically and not in real time, SCEF 295/NEF 358 may begin to adjust any throttling based on the predicted congestion duration before receiving an updated signal 530 indicating that congestion has eased. In this way, unnecessary throttling at the deep core network (e.g., within WAN 140) may be avoided. SCEF 295/NEF 358 may begin to ease throttling based on the back-off schedule.

SCEF 295/NEF 358 may further receive updated signals 520 and 530 from MME 250/AMF 320 and eNodeB 220/gNodeB 310 containing updated information associated with UE 110 and updated load level information associated with eNodeB 220/gNodeB 310. Based on receiving the updated signals 520 and 530, SCEF 295/NEF 358 may calculate a new congestion level associated with eNodeB 220/gNodeB 310. If SCEF 295/NEF 358 determines that no congestion is detected or predicted, SCEF 295/NEF 358 may adjust the throttling and/or remove any restrictions on traffic associated with UEs 110. For example, SCEF 295/NEF 358 may disable any EAB or ACDC restrictions placed on UEs 110 and signal eNodeB 220/gNodeB 310 accordingly.

Figure 6:
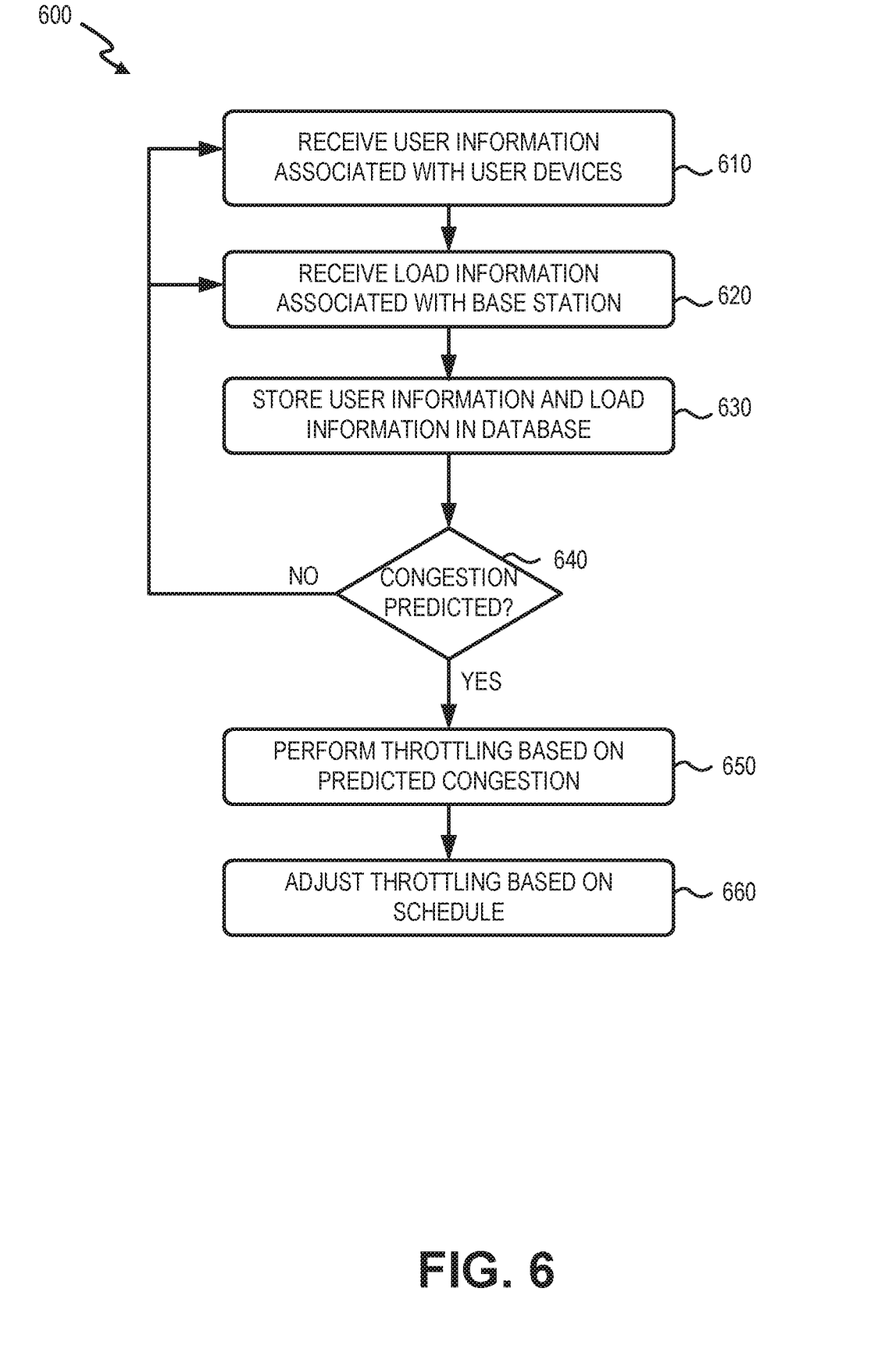
FIG. 6 is a flowchart of a process for performing adaptive congestion control.

FIG. 6 is a flow diagram illustrating an exemplary process 600 for performing adaptive congestion control. In one implementation, process 600 may be performed by SCEF 295/NEF 358.

Process 600 may begin by receiving user information associated with UEs 110 (block 610). For example, SCEF 295/NEF 358 may receive information from MME 250/AMF 320 indicating a location associated with UE 110. In addition, SCEF 295/NEF 358 may receive additional information associated with UE 110, such as RAT type, APN, ASs 150 associated with UE 110, and other information.

Process 600 may continue by receiving load information associated with a base station (block 620). For example, SCEF 295/NEF 358 may receive information from eNodeB 220/gNodeB 310 indicating an overall load level, a level per RAT, and a predicted congestion duration associated with eNodeB 220/gNodeB 310. The predicted congestion duration may be based on historic and heuristic network congestion data, such as congestion based on a time of day, day of the week, etc. The overall load level may include the combined load of all of the traffic in the cell site including, for example, IoT traffic, consumer traffic, and mixed types of traffic. The UE location information and the base station load data may be stored in a database (block 630). For example, SCEF 295/NEF 358 may store the received information in a table in database 540 with a load limit associated with eNodeB 220/gNodeB 310.

Process 600 may continue by determining whether congestion is predicted (block 640). For example, based on the information in the table, SCEF 295/NEF 358 may calculate a congestion level associated with eNodeB 220/gNodeB 310. If the congestion level is low and no congestion is predicted (block 640—no), processing may continue to blocks 610 and 620 and SCEF 295/NEF 358 may continue to receive the user information associated with UEs 110 and the load information associated with the base station. If congestion is predicted (block 640—yes), SCEF 295/NEF 358 may perform throttling based on the calculated congestion level (block 650).

If the predicted congestion level is at a warning level, SCEF 295/NEF 358 may identify AS 150 providing content to UEs 110 in the congested cell and may transmit an instruction to AS 150 to throttle traffic destined for UEs 110, such as mobile terminated (MT) traffic, in the congested cell. In addition, SCEF 295/NEF 358 may send additional instructions to PCRF 290/PCF 354 and SGW 260/PGW 280/UPF 330 instructing PCRF 290/PCF 354 and SGW 260/PGW 280/UPF 330 to throttle MO and MT traffic associated with UEs 110 in order to reduce or avoid user plane congestion. Performing throttling and congestion control close to the traffic source may reduce the downstream network element congestion and cell site congestion.

If the predicted congestion level is at a critical level, SCEF 295/NEF 358 may send an instruction to eNodeB 220/gNodeB 310 to control MO traffic in the congested cell and/or block MT user plane traffic to the congested cell. The command may further include an indication of measures to take in order to throttle traffic and a backoff timer associated with the throttling. In one implementation, the instruction may indicate a type of traffic to throttle. For example, the instruction may indicate that EAB configured devices should be throttled.

Process 600 may continue by adjusting the throttling based on a schedule (block 660). For example, based on the predicted congestion duration received from eNodeB 220/gNodeB 310, SCEF 295/NEF 358 may calculate a back-off schedule for the throttling. Based on previous traffic patterns and congestion data, eNodeB 220/gNodeB 310 and SCEF 295/NEF 358 may be able to predict a duration of the congestion. Using the predicted congestion duration, eNodeB 220/gNodeB 310 may be able to determine when and how to adjust the throttling based on the back-off schedule. Therefore, eNodeB 220/gNodeB 310 may determine a schedule for easing the throttling prior to receiving an indication that the congestion level has decreased. In this way, unnecessary throttling at the deep core network may be avoided.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of signal flows have been described with respect to FIG. 5, and a series of blocks have been described with respect to FIG. 6, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    receiving, from a mobility management device, user device information, wherein the user device information includes a location associated with a user device and an identifier of a base station associated with the location of the user device;
    receiving, from the base station, load information associated with the base station;
    determining, based on the user device information and the load information, whether congestion is predicted at the base station;
    performing traffic throttling in response to determining that congestion is predicted, wherein performing the traffic throttling comprises:
    instructing an application server associated with the user device to throttle traffic destined for the base station when the predicted congestion is at a first level, and
    instructing the base station to throttle traffic originating from the user device and to block traffic destined for the user device when the predicted congestion is at a second level, wherein the second level is higher than the first level;
    determining, based on the load information, a schedule for adjusting the traffic throttling; and
    adjusting the traffic throttling based on the schedule.

2. The method of claim 1, wherein the user device information includes an indication of the application server associated with the user device.

3. The method of claim 1, further comprising:
    determining, based on the load information and a congestion threshold associated with the base station, a level associated with the predicted congestion.

4. The method of claim 1, wherein the load information includes an indication of a predicted duration of a congestion period, and wherein the schedule is based on the predicted duration of the congestion period.

5. The method of claim 4, wherein the predicted duration of the congestion period is based on historic and heuristic network traffic and congestion data.

6. The method of claim 1, wherein the load information includes an overall load associated with the base station and loads per type of user device attached to the base station.

7. The method of claim 1, wherein the schedule includes a throttle back-off schedule.

8. A system comprising:
    a memory to store instructions; and
    one or more processors configured to execute the instructions to:

receive, from a mobility management device, user device information,
wherein the user device information includes a location associated with a user device and an identifier of a base station associated with the location;
receive, from the base station, load information associated with the base station;
determine, based on the user device information and the load information, whether congestion is predicted at the base station;
perform, based on the user device information, traffic throttling in response to determining the congestion is predicted,
wherein, when performing the traffic throttling, the one or more processors are configured to execute the instructions to:
instruct an application server associated with the user device to throttle traffic destined for the base station when the predicted congestion is at a first level, and
instruct the base station to throttle traffic originating from the user device and to block traffic destined for the user device when the predicted congestion is at a second level, wherein the second level is higher than the first level;
determine, based on the load information, a schedule for adjusting the traffic throttling; and
adjust the traffic throttling based on the schedule.

9. The system of claim 8, wherein the user device information includes an indication of the application server associated with the user device.

10. The system of claim 8, wherein the one or more processors is further configured to execute the instructions to:
determine, based on the load information and a congestion threshold associated with the base station, a level associated with the predicted congestion.

11. The system of claim 8, wherein the load information includes an indication of a predicted duration of a congestion period, and wherein the schedule is based on the predicted duration of the congestion period.

12. The system of claim 11, wherein the predicted duration of the congestion period is based on historic and heuristic network traffic and congestion data.

13. The system of claim 8, wherein the load information includes an overall load associated with the base station and loads per type of user device attached to the base station.

14. The system of claim 8, wherein the schedule includes a throttle back-off schedule.

15. A non-transitory computer-readable medium storing instructions, the instructions comprising:
one or more instructions that, when executed by a processor, cause the processor to:
receive, from a mobility management device, user device information, wherein the user device information includes a location associated with the user device and an identifier of a base station associated with the location;
receive, from the base station, load information associated with the base station;
determine, based on the user device information and the load information, whether congestion is predicted at the base station;
perform traffic throttling in response to determining the congestion is predicted, wherein the one or more instructions that cause the processor to perform the traffic throttling includes one or more instructions that cause the processor to:
instruct an application server associated with the user device to throttle traffic destined for the base station when the predicted congestion is at a first level, and
instruct the base station to throttle traffic originating from the user device and to block traffic destined for the user device when the predicted congestion is at a second level, wherein the second level is higher than the first level;
determine a schedule for adjusting the traffic throttling; and
adjust the traffic throttling based on the schedule.

16. The non-transitory computer-readable medium of claim 15, wherein the user device information includes an indication of the application server associated with the user device.

17. The non-transitory computer-readable medium of claim 15, wherein the instructions further comprise:
one or more instructions that cause the processor to determine a level associated with the predicted congestion based on the load information and a congestion threshold associated with the base station.

18. The non-transitory computer-readable medium of claim 15, wherein the load information includes an indication of a predicted duration of a congestion period, and wherein the schedule is based on the predicted duration of the congestion period.

19. The non-transitory computer-readable medium of claim 18, wherein the predicted duration of the congestion period is based on historic and heuristic network traffic and congestion data.

20. The non-transitory computer-readable medium of claim 15, wherein the schedule includes a throttle back-off schedule.

* * * * *